(No Model.)  6 Sheets—Sheet 1.
H. A. WENDELL.
CAR AXLE BOX.
No. 352,171.  Patented Nov. 9, 1886.
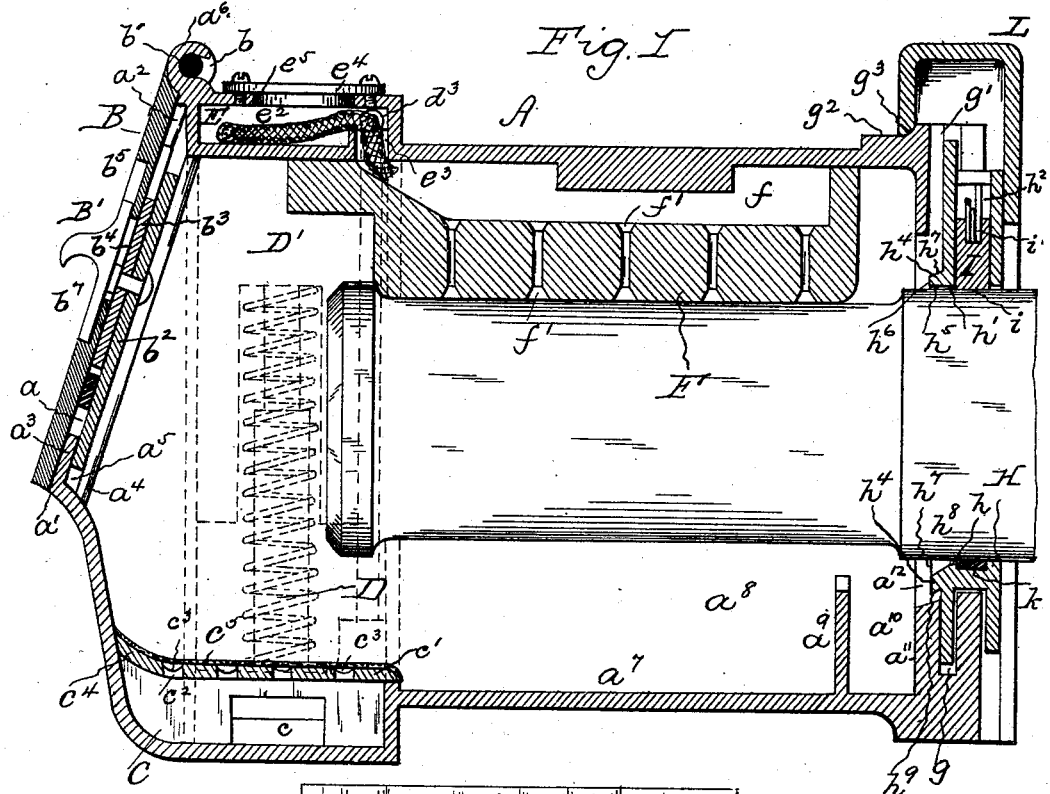
WITNESSES:
INVENTOR
Henry A. Wendell
By S. J. VanStavoren
ATTORNEY (No Model.)　　　　　　　　　　　　　　　　　　　6 Sheets—Sheet 2.
H. A. WENDELL.
CAR AXLE BOX.
No. 352,171.　　　　　　　　　　　　　Patented Nov. 9, 1886.
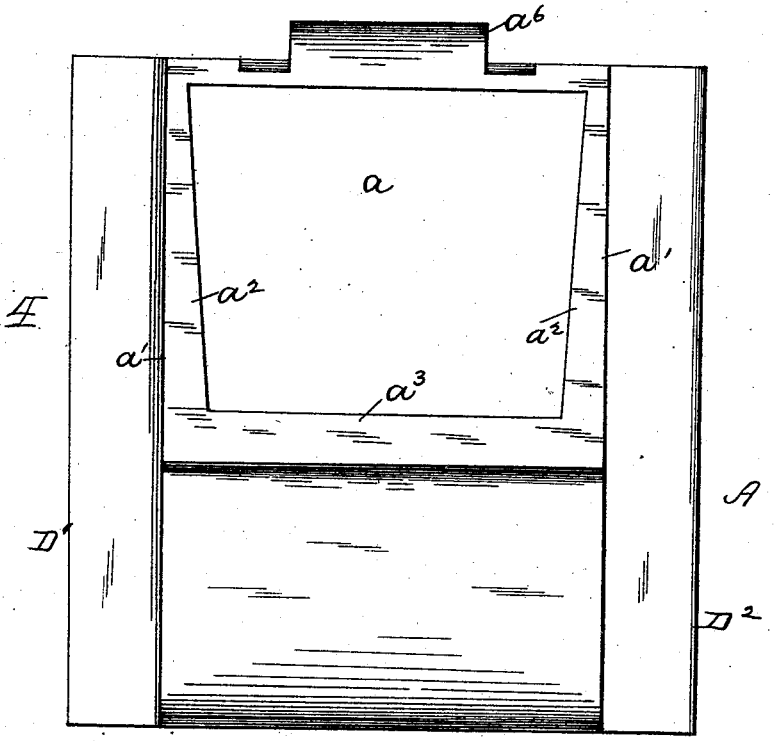
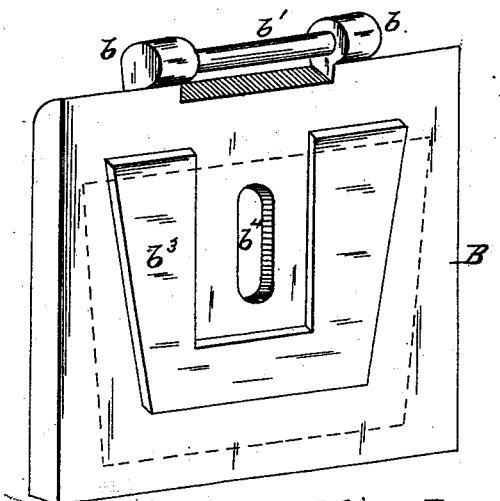
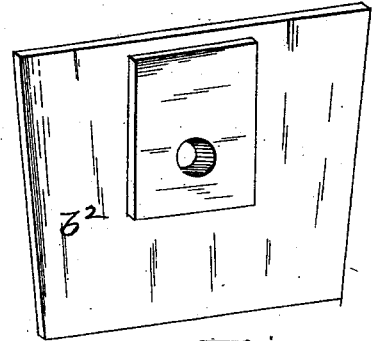
WITNESSES:　　　　　　　　　　　　　　　　INVENTOR
　　　　　　　　　　　　　　　　　　　　Henry A. Wendell
　　　　　　　　　　　　　　　　　By S. J. Van Stavoren
　　　　　　　　　　　　　　　　　　　　ATTORNEY (No Model.)  6 Sheets—Sheet 3.

H. A. WENDELL.
CAR AXLE BOX.

No. 352,171. Patented Nov. 9, 1886.

WITNESSES:

INVENTOR
Henry A. Wendell
By S. J. Van Stavoren
ATTORNEY (No Model.)

H. A. WENDELL.
CAR AXLE BOX.

No. 352,171. Patented Nov. 9, 1886.

WITNESSES:

INVENTOR,
Henry A. Wendell
By S. J. Van Stavoren
ATTORNEY (No Model.)

H. A. WENDELL.
CAR AXLE BOX.

6 Sheets—Sheet 5.

No. 352,171. Patented Nov. 9, 1886.

WITNESSES:

INVENTOR
Henry A. Wendell
By S. J. Van Stavoren
ATTORNEY (No Model.)  6 Sheets—Sheet 6.

H. A. WENDELL.
CAR AXLE BOX.

No. 352,171. Patented Nov. 9, 1886.

WITNESSES:

INVENTOR,
Henry A. Wendell
By S. J. Van Stavoren
ATTORNEY

UNITED STATES PATENT OFFICE.

HENRY A. WENDELL, OF PHILADELPHIA, PENNSYLVANIA.

CAR-AXLE BOX.

SPECIFICATION forming part of Letters Patent No. 352,171, dated November 9, 1886.

Application filed September 19, 1885. Serial No. 177,533. (No model.)

*To all whom it may concern:*

Be it known that I, HENRY A. WENDELL, a citizen of the United States, residing at Philadelphia, in the county of Philadelphia and State of Pennsylvania, have invented certain new and useful Improvements in Car-Axle Boxes, of which the following is a specification, reference being had therein to the accompanying drawings, wherein—

Figure 7:
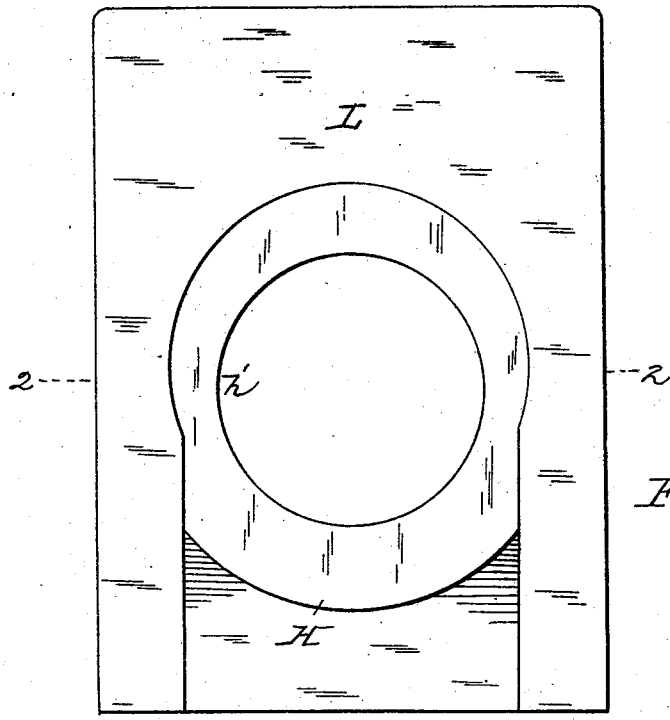
Figure 9:
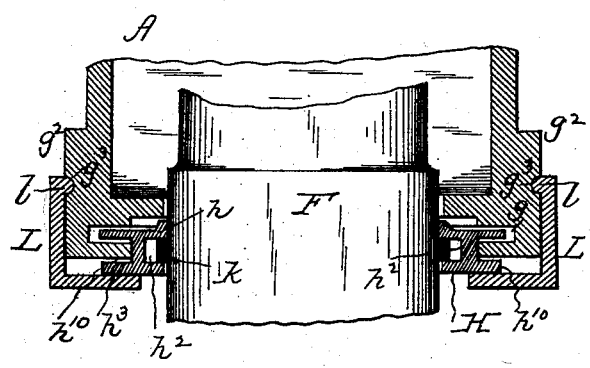
Figure 8:
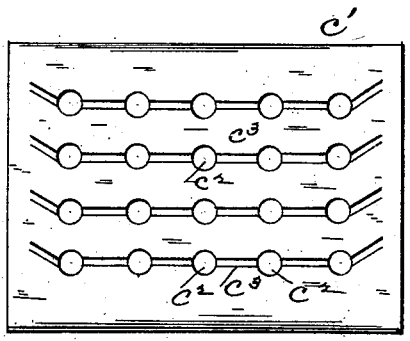
Figure 10:
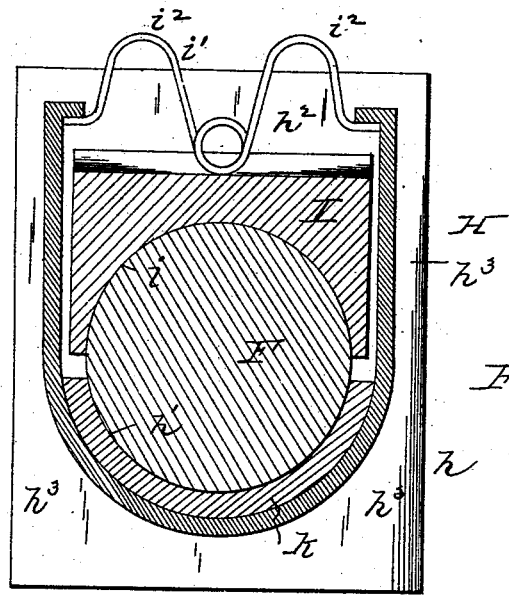
Figure 11:
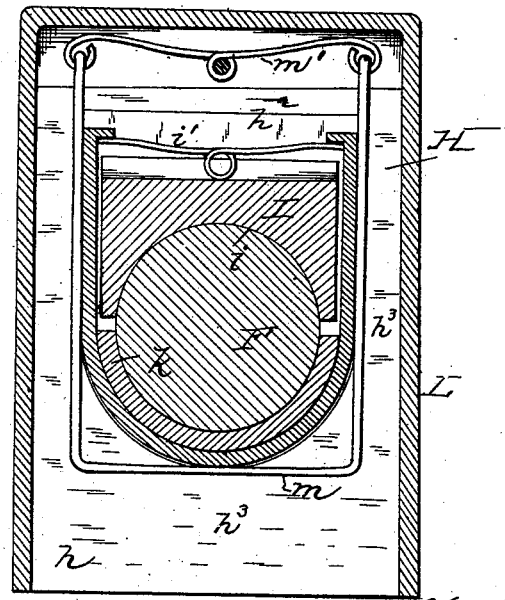
Figure 12:
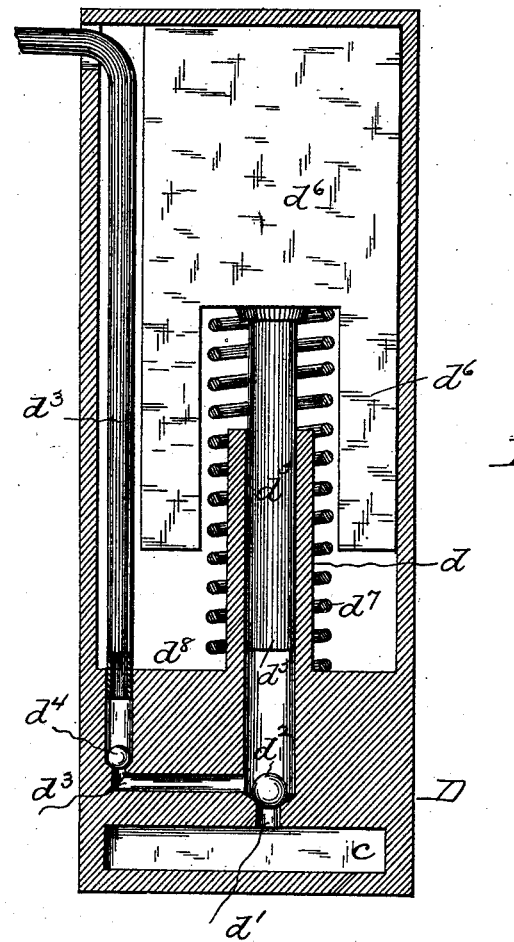
Figure 13:
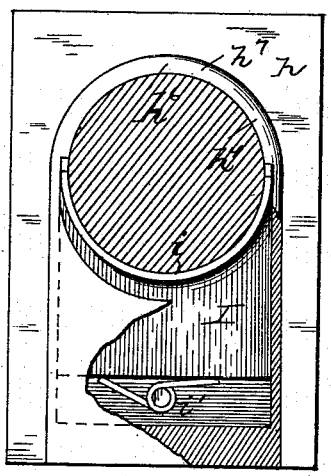
Figure 15:
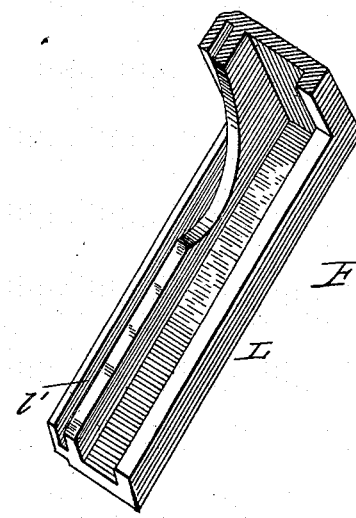
Figure 14:
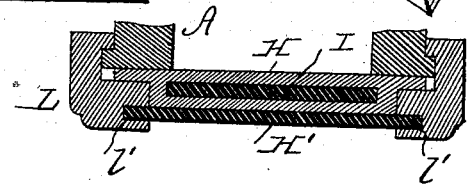

Figure 1 is a longitudinal vertical section of a car-axle box embodying my improvements. Fig. 2 is a plan view of the front portion of the box, partly in section, and with the lid removed. Fig. 3 is a section on line 1 1, Fig. 2. Fig. 4 is an elevation of the front end of the box with its lid displaced. Fig. 5 is a perspective of the lid, looking at its under or inner side. Fig. 6 is a perspective of the slide adapted to the lid for locking it to the box. Fig. 7 is an elevation of the rear end of the box. Fig. 8 is a plan of the drip-plate or top of the oil-well of the box. Fig. 9 is a section on line 2 2, Fig. 7. Fig. 10 is a vertical transverse section through the dust-shield for the rear end of axle-box. Fig. 11 is a like section through shield and box, showing a spring-support for the shield. Fig. 12 is a sectional view, partly in elevation, showing pumping mechanism for elevating oil to the brass or bearing for the axle-journal. Fig. 13 is an elevation, partly sectional, of a modified form of dust-shield. Fig. 14 is a horizontal section of same and part of the box and slide for securing the shield to the box. Fig. 15 is a perspective view of half or part of said slide; and Fig. 16 a view similar to Fig. 14, showing modification of construction of slide and axle-box fastening.

My invention has relation to car-axle boxes; and it has for its objects a simple, inexpensive, but effective locking-lid, an oil-pumping device for the axle-journal brass or bearing, an oil chamber or well in the box, a dust-shield for the rear end of the box, and a slide or cover for fastening the shield to or on the box.

My invention accordingly consists of the combination, construction, and arrangement of parts, as hereinafter more particularly described and claimed.

In the drawings, A represents a car-axle box having a lid-opening, $a$, in its angular front face, $a'$. This opening has side and bottom flanges, $a^2$ $a^3$, respectively, flush with face $a'$. Back of the side flanges, $a^2$, on the inner sides of box A, are adjacent ribs or shoulders $a^4$, forming inside grooves, $a^5$, between the flanges $a^2$ and ribs $a^4$. (Seen more plainly in Fig. 1.)

The edges of the side flanges, $a^2$, of opening $a$ converge toward each other from above downward to form an approximately keystone-shaped lid-opening, as shown, for a purpose hereinafter described.

The lid B is of the usual square or rectangular shape, having top lugs, $b$, united by a rod or fixed pintle, $b'$, which has its bearings in a hook-shaped lug or lugs, $a^6$, formed on or at the front top edge of the box, A. The use of the hooked form of lugs $a^6$ and fixed pintle $b'$ for lid B provides a hinged connection for the lid and admits of its easy removal from the box, when necessary. Any of the usual or other means for fastening the lid, when closed, may be employed; but I prefer to use the following instrumentalities in connection with the keystone-shaped opening of the box. Upon the under side of the lid is a sliding plate, $b^2$, of a size smaller than and of a shape corresponding to that of box-opening $a$, so as to readily pass through the same. This plate slides upon ways $b^3$ on lid B, and has a knob or handle, B', projecting through and sliding in elongated slot $b^4$, vertically arranged in the lid. The slot $b^4$ may, if desired, be formed with a shoulder or double slot, $b^5$, to receive a guide or flange, $b^7$, on knob B'. The knob B' and plate $b^2$ are connected by a rivet, screw, or other suitable device, as desired, so that by moving knob B' up and down in the lid-slot $b^4$ the plate $b^2$ follows or moves therewith.

To close the box-opening $a$, the plate $b^2$ on lid B is first pushed upwardly to its limit of motion, then turned down; or, if off the box, the lid is then hooked onto lugs $b'$ and turned down upon the box-face $a'$, the plate $b^2$ having then passed into the box beyond the flanges $a^2$ $a^3$ or to the plane of the grooves $a^5$. Knob B' is then pushed downwardly to correspondingly move plate $b^2$ or its side and bottom edges back of the side and bottom flanges, $a^2$ $a^3$, respectively, of the box A, as shown in Fig. 1, to firmly fasten the lid to the box. To remove the former from the latter, said described movements are reversed. As the side edges of the plate $b^2$ are moved back of the flanges $a^2$, they enter the box-grooves $a^3$, and the ribs $a^4$ serve as shields or bars to prevent leakage of oil through the sides of the box-opening when the lid is closed.

In the bottom $a^7$ of the box A, and preferably at or near its forward end, is a depression or chamber, C, having a side outlet, $c$, and a perforated cover, $c'$. The openings $c^2$ in the latter are connected by grooves or channels $c^3$. (Seen more plainly in Fig. 8.) The forward end, $c^4$, of cover $c'$ is slightly inclined or curved, and its perforations and grooves are covered by a felt, wire, or other suitable screen, $c^5$. The inclination of the end $c^4$ of cover $c'$ and its perforations and their connecting-grooves rapidly and effectually re-convey drip or other oil to chamber C, and the filtering felt or screen $c^5$ prevents dirt or débris from entering the same, so that a supply of clean oil for lubricating purposes is always contained or provided in chamber C, which oil is conveyed to the axle brass or bearing by means of a pump, D, located in a vertically-arranged side pocket or chamber, D', formed in the axle-box in line with chamber C. (See Figs. 2 and 4.) To make both sides of the axle-box look symmetrical, a projection, $D^2$, corresponding in form to the outside configuration of chamber D, or a duplicate of the latter, is formed on the opposite side of the axle-box.

The pump D is more plainly shown in Fig. 12, and is of the construction illustrated, or has a cylinder, $d$, having an inlet-pipe, $d'$, which communicates with the side opening, $c$, of chamber C. In inlet-pipe $d'$ is a ball or other like valve, $d^2$, and in the outlet-pipe $d^3$ of cylinder $d$ is another like valve, $d^4$. In the cylinder works a solid or other piston or plunger, $d^5$, having an inverted-U-shaped top weight, $d^6$. Both the plunger and weight are supported in an elevated position by a spiral spring, $d^7$, surrounding the cylinder and interposed between its ledge $d^8$ and the weight $d^6$. The latter is so proportioned to the elasticity or power of the spring that the least vertical vibration or jarring of the car as it travels causes a reciprocation of the plunger in the cylinder to effect a pumping of the oil from chamber C to the outlet-pipe $d^3$. This pipe is continued up to and through the top of the box, and leads into a chamber, E, formed transversely on the top of the box A. The chamber E is preferably formed with a gutter, $e$, into which the end of pipe $d^3$ leads or conducts the oil thereto, and from this gutter is a channel or opening, $e'$, leading to the journal brass or bearing F, whereby oil, as it is pumped from chamber C, is conducted directly to said journal. The bearing F is preferably formed with a top chamber, $f$, from the bottom of which are one or more openings, $f'$, leading to the journal. The surplus oil supplied to bearing F, after filling its chamber $f$, overflows the sides of gutter $e$ of chamber E, and accumulates in the latter to form a reservoir or storage of oil for use in case the pump, from accidental or other causes, ceases working or gets out of order, in which case a wick, $e^2$, in chamber E, and passing through an opening, $e^3$, leading to brass chamber $f$, (see Fig. 1,) is employed to conduct the oil from chamber E to the bearing F. The chamber E is provided with any suitable cover, $e^4$, as shown, for closing its top opening, $e^5$, to prevent splashing of oil therefrom.

The aforesaid described location and construction of the pumping device for box A leave the customary oil-well, $a^8$, of the latter free and unobstructed, so that the usual waste and oil can be inserted into well $a^8$ for lubricating purposes, in addition to the pumping devices D. In the rear of the well $a^8$ is a transverse bar or ridge, $a^9$, forming a gutter or chamber, $a^{10}$, between said bar and the rear wall, $a^{11}$, of the axle-box, for preventing overflow or splashing of oil from well $a^8$ to the opening $a^{12}$ in rear wall of the axle-box. The rear axle-box wall $a^{11}$ has an inside groove, $g$, open top $g'$, and outside flanges or ribs, $g^2$, in which are preferably formed grooves or channels $g^3$. In the inside grooves, $g$, slides a dust-shield, H, composed preferably of a frame, $h$, having axle-opening $h'$, upper vertical chamber, $h^2$, and outside groove or recess, $h^3$, in its side and bottom edges. The inside edge of the axle-opening $h'$ in shield H is provided with a flange, $h^4$. The inside edge, $h^5$, of the upper half or part, $h^6$, of this flange is straight or parallel with the axle, while the outside edge, $h^7$, thereof is beveled from above downwardly, or inclines toward the axle, (see Fig. 1,) to more readily return to the box any oil or drip finding its way to or splashed against parts of said shield adjacent to upper part, $h^6$, of flange $h^4$. The lower part or half, $h^7$, of flange $h^4$ is beveled or inclined both on its upper and lower or inside and outside edges, $h^8$ and $h^9$, respectively, for the same purpose.

In chamber $h^2$ of shield H is a slide, I, having a curved lower side, $i$, to fit and impinge against the axle, a suitable spring, $i'$, being used to make a forcible impingement between said slide and axle. When the spring $i'$ is used, I prefer to make it as shown in Figs. 1 and 10, so that its curved ends $i^2$ $i^2$ project above the top of the shield H, to admit of taking hold of the spring, so that it can be raised and its pressure relieved or removed from slide I, to permit the latter to readily yield or raise out of the way of the axle as it is inserted into or outdrawn from box A. Between the axle and lower half of the opening $h$ of shield H is preferably placed any suitable leather or other packing, $k$, to form a tight joint for the lower half of the axle. The outside edge, $h^{10}$, of grooves $h^3$ of shield H fit over the outer side of the rear axle-box wall, and are covered by a slide or cover, L. This slide is of an inverted-U or approximate shaped configuration, and has front inner edges, preferably beaded, as shown at $l$, Fig. 9, to fit and slide in the grooves $g^3$ of flanges $g^2$ on the rear end of box A, so that this slide L covers or incloses the shield H and rear end of box, to effectually exclude dust from the axle-box and prevent leakage of oil therefrom.

To relieve the axle of the weight of the shield H, and avoid undue wear of their contacting-surfaces, the shield H is preferably supported by a U-shaped bar or rod, $m$, having its upper ends connected to a spring, $m'$, suitably fastened to the axle-box slide or cover, the rod $m$ being placed in the side and bottom grooves, $h^3\ h^3$, of the dust-shield frame $h$, as plainly shown in Fig. 11.

In Figs. 1 and 10 I have shown the spring $i'$ for slide I, and the latter located above the axle; but, if desired, this position may be reversed, as shown in Fig. 13.

Figure 16:
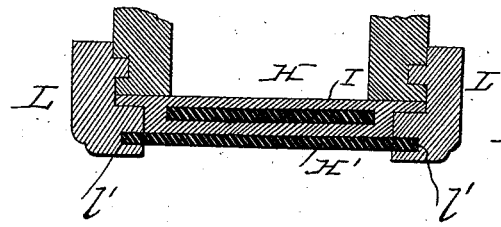

If desired, a supplementary shield, H', may be used in connection with shield H, in which case it slides into side grooves, $l'$, formed on the inner sides of slide L, as shown in Figs. 14 and 16, a portion of slide L with such grooves being shown in perspective, Fig. 15.

Instead of forming the grooves $g^3$ for shield H in the end wall of the axle-box, they may be formed in the slide L, as shown in Figs. 14 and 16, in which case the end of the axle-box is open or without grooves, and the slide is connected thereto by sliding in front of ribs or flanges on the axle-box, as indicated in Fig. 14, or by forming grooves therein, as shown in Fig. 16.

In some cases the chamber E and its oiling-wick may be used independently of the pumping devices, and when no storage of oil is required in chamber E it may then consist of its gutter $e$ only, or the wick $e^2$ is then dispensed with.

What I claim is—

1. An axle-box having a hinged lid removable from the box and a sliding lock or fastening device having a hand-piece, $b^7$, projecting through the lid beyond its outer surface, substantially as shown and described.

2. An axle-box having an angular or inclined front face with keystone-shaped or downwardly-tapering opening, a lid removable from said box and having a locking slide-plate adapted to the rear side of said opening, having a hand-piece, $b^7$, and the locking-slide moving in the direction of the length of the lid, substantially as shown and described.

3. The combination, with axle-box A, having tapering opening $a$, of a lid, B, having inside slide, $b^2$, adapted to opening $a$, and provided with knob B', substantially as shown and described.

4. The combination, with axle-box A, having hooked lug $a^6$, inside grooves, $a^5$, and opening $a$, having flanges $a^2\ a^3$, of lid B, having sliding knob B', and locking-plate $b^2$, adapted to said grooves and flanges, substantially as shown and described.

5. An axle-box having chamber C, located at the forward end of the box and below its bottom, a drain or drip cover, $c'$, for said chamber, and a pumping device located to one side of chamber C and having a lateral communication therewith, substantially as shown and described.

6. An axle-box having a bottom chamber, C, provided with a perforated cover and screen, substantially as shown and described.

7. An axle-box having at its front end a chamber, C, provided with inclined front end, and cover $c'$, having perforations $c^2$, grooves $c^3$, connecting said perforations, and screens $c^5$, substantially as shown, and for the purpose set forth.

8. In an axle-box, the chamber E, located above the top of the axle-box and having elevated gutter $e$ and duct $e'$, leading to axle-journal bearing, in combination with an oil-pumping device having an outlet-pipe connecting with said gutter, substantially as shown and described.

9. In an axle-box, the covered chamber C and top chamber, E, having a gutter, $e$, and duct $e'$, leading to axle-journal bearing, in combination with a pumping device connecting said chambers, substantially as shown and described.

10. An axle-box having covered chamber C, oil-pumping device D, chamber E, having gutter $e$, ducts $e'\ e^3$, and wick $e^2$, substantially as and for the purpose set forth.

11. An axle-box having bottom chamber, C, communicating with a side vertical chamber, D', a top chamber, E, communicating with the axle-bearing, and a pumping device located in chamber D' and connecting chambers C and E, substantially as shown and described.

12. In an axle-box, the combination of bearing F, having at its upper part an open chamber, $f$, and bottom apertures, $f'$, a chamber, E, located above the top of the axle-box at its forward end and communicating with bearing-chamber $f$, and a pumping device arranged for operation, substantially as and for the purpose set forth.

13. A car-axle box having at its forward end and above the top of the box an oil-chamber, E, provided with an elevated gutter, $e$, and a duct, $e'$, located below gutter $e$, and having a wick, $e^2$, substantially as set forth.

14. An axle-box having chambers C and E, pumping device D, and oil-well $a^8$, having dam or bar $a^9$, substantially as shown and described.

15. In combination with a car-axle box having side chamber, D', a pump, D, having an inverted-U-shaped weight, $d^6$, on the piston or plunger-rod and fitting said chamber, and a spring, $d^7$, between the weight and pump, substantially as shown and described.

16. An axle-box having a dust-shield, H, adapted to the rear end thereof, having sliding plate with spring $i'$, and a sliding cap or cover for said box and shield, substantially as shown and described.

17. An axle-box shield composed of a sliding or adjustable plate, I, fitting in a frame, h, having around the inner edge of its opening a flange the outer edge of upper half and the inner and outer edges of the lower half of which are inclined or beveled downwardly, substantially as shown and described.

18. The combination of a car-axle box having at its rear end a removable cap or cover, L, for its rear end, and a dust-shield composed of frame h, having side and bottom edge grooves and a sliding plate provided with pressure-spring and adapted to the axle, substantially as shown and described.

19. The combination, with a car-axle box having at its rear end a removable cap or cover, L, of a dust-shield having sliding plate or cover I, and spring i', supporting-bar m, and spring m', substantially as shown and described.

20. The combination of a car-axle box having grooves or projections around the outside of its rear end, a sliding or removable cap, L, adapted to said grooves or projections, and a dust-shield inclosed in said cap, substantially as set forth.

21. In combination with axle-box A, the sliding cap L and dust-shield H, substantially as shown and described.

22. In combination with axle-box A, the dust-shields H and H' and sliding cap L, substantially as shown and described.

In testimony whereof I affix my signature in presence of two witnesses.

HENRY A. WENDELL.

Witnesses:
JOHN RODGERS,
S. J. VAN STAVOREN.